April 30, 1957   J. M. FREIBERG   2,790,270
APPARATUS FOR TEMPERING GLASS
Filed July 12, 1954   8 Sheets-Sheet 2

INVENTOR
JAMES M. FREIBERG
Oscar L. Spencer
ATTORNEY

April 30, 1957     J. M. FREIBERG     2,790,270
APPARATUS FOR TEMPERING GLASS Filed July 12, 1954     8 Sheets-Sheet 8

INVENTOR
JAMES M. FREIBERG

Oscar L. Spencer
ATTORNEY

United States Patent Office 2,790,270
Patented Apr. 30, 1957

2,790,270

APPARATUS FOR TEMPERING GLASS

James M. Freiberg, New Kensington, Pa., assignor to Pittsburgh Plate Glass Company, Allegheny County, Pa., a corporation of Pennsylvania Application July 12, 1954, Serial No. 442,513

13 Claims. (Cl. 49—45)

The present invention relates to apparatus for tempering glass, and more specifically, to apparatus which assures an even temper being imposed upon a curved sheet of glass having different radii of curvature along an axis thereof.

The basic process involved in tempering glass is old and described in prior art patents. Such process comprises heating a glass sheet above its annealing range and then rapidly cooling the surfaces of the sheet to set the latter while the center is still hot. This action results in a sheet having its surfaces in compression and intermediate portion in tension. The sheet is much stronger than untempered glass when provided with such stress distribution. Therefore, when the outer surface or compression skin is broken, the locked up stresses within the glass cause it to shatter into a large number of very small pieces. The uniformity of size of the shattered particles indicates the uniformity of the temper of the glass.

Typical prior art tempering apparatus include nozzles disposed on opposite sides of a glass sheet for directing a plurality of air blasts against the adjacent surface of the sheet and means for moving the nozzles to prevent formation of non-uniform temper patterns on the glass. Where the glass sheet is flat or includes shallow bent portions, the nozzles may be moved orbitally in a flat plane substantially parallel to the general plane of the sheet to obtain satisfactory uniformity of temper.

When the glass sheet is provided with deep bends at the ends thereof, as in the present day automobile windshields and backlights, imparting a plane circular movement to the nozzles causes the latter to move toward and away from the bent end portions of the sheet. Such action causes non-uniformity of temper and also inhibits obtaining the desired degree of temper. When the nozzles move toward the sheet, the air, after impinging upon the sheet, is prevented from leaving, thus shielding the glass surface from additional cold air. This results in slow cooling and prevents obtaining the desired temper. When the nozzles move away from the sheet, the rate of cooling is also decreased because of increased diffusion of the cold air blast with the air warmed by its exposure to the heated glass.

The sudden recent change in design of automobile backlights from relatively flat shapes, to those provided with deep bends at the opposite extremities has accelerated the obsolescence of tempering apparatus. Since the replacement cost to build completely new oscillators is rather expensive, means have been devised to adapt tempering machines hitherto used for tempering relatively flat sheets of glass to temper glass sheets of modern design.

The principal object of the present invention is to provide apparatus for imparting uniform temper to a glass sheet provided with end portions bent to extreme curvatures relative to the center of the sheet.

Another object of the invention is to provide apparatus which imparts uniform air blasts to a curved glass sheet having a varying radius of curvature along an axis thereof by maintaining the air blast nozzles a substantially uniform distance from the sheet surfaces.

Another object of the invention is to adapt tempering apparatus hitherto used for tempering flat sheets of glass to provide uniform tempering of glass having extreme portions bent considerably with respect to the rest of the glass sheet.

These and other objects of the invention have been accomplished by modifying existing tempering apparatus to convert the longitudinal reciprocating component of the flat orbital movement of a structural element thereof into a compound motion including a reciprocation perpendicular to the plane of orbital movement. This change is accomplished by moving upper and lower nozzle members horizontally in a fixed orbit with a movable frame and pivoting curved wing boxes containing additional air nozzles at each extremity of the nozzle members to allow the nozzles contained in these wing boxes to be pivoted vertically in concert with the horizontal orbital movement of the nozzle members. This pivoting allows the wing box nozzles to remain a fixed spaced distance from the curved edges of the glass sheet being tempered.

In a preferred embodiment of the invention, a frame structure containing opposing nozzles is moved orbitally in a horizontal plane. A fixed housing is provided with a series of ball transfers against which specially shaped wear plates provided on the pivotable wing boxes abut. Thus, the horizontal orbital motion typical of the prior art tempering apparatus nozzles has been transformed into a combination of movements. This combination includes a substantially unchanged motion of the central nozzles opposite the central portion of the glass merging into a combination of horizontal and vertical movements of the wing box nozzles opposite each extremity of the glass to enable each latter nozzle to follow a contour substantially parallel to that of a small portion of a glass extremity.

A more detailed description of a specific tempering apparatus which has been modified according to the teachings of my invention follows:

In the drawings which form part of the description.

Tempering apparatus frame and its support

The tempering apparatus comprising the present invention includes a movable frame housing 15 mounted for orbital movement upon a fixed structure. The fixed structure is provided with a floor on one side of which are mounted plates 20 containing ball transfer units 21 and the other side of which contains a recessed drive motor 22 which turns a drive shaft 24. The latter is coupled at its opposite extremities such as by gears 25 to a pair of crank drives 26 at floor level. A crank arm 28 fixed to the bottom of movable frame 15 extends upwardly from the crank drive to impart a circular orbital motion to the frame in a horizontal plane.

Fixed vertical columns 18 are located outside of the zone of movement of movable frame 15 to enable free movement of the latter. Cross beams 16 interconnect columns 18 and knee braces 17 reinforce the connections to provide a fixed frame 19. A pair of lower tubular housings 32 are supported in recesses 33 of the vertical columns 18 and extend longitudinally inwardly therefrom through intermediate brace supports 35. These tubular housings comprise inwardly and upwardly extending arms 34 terminating in ball transfer housings 36. Ball transfers 38 are mounted for universal rotation within ball transfer housings 36. In addition, clamps 37 are secured about the tubular housings and set screws 39 are provided to fix the horizontal position of the ball transfers 38.

Longitudinally inwardly directed upper tubular housings 42 are attached similarly in openings 43 of the vertical columns 18 and are provided at their inner ends with ball transfer housings 44 in which ball transfers 46 are mounted for universal rotation. Bearing supports 45 on knee braces 17 also support housings 42. Adjustment clamps 47 and set screws 48 are provided to adjust the horizontal position of the ball transfers 46.

A series of conveyor rolls 50 are mounted on stub shafts 52 for rotation therewith. Suitable sprockets 54 contained in housings 56 are fixed to the axles 52 to drive the conveyor rolls 50 by a chain drive. The housing 56 is mounted on the intermediate brace support 35 by suitable reinforcements 58. The brace support 35 is fixed to the floor. Opposing conveyor rolls 50 support opposite longitudinal edges of a frame F which carries a tempering mold M supporting a bent glass sheet G.

Structure of movable frame housing

Figure 1:
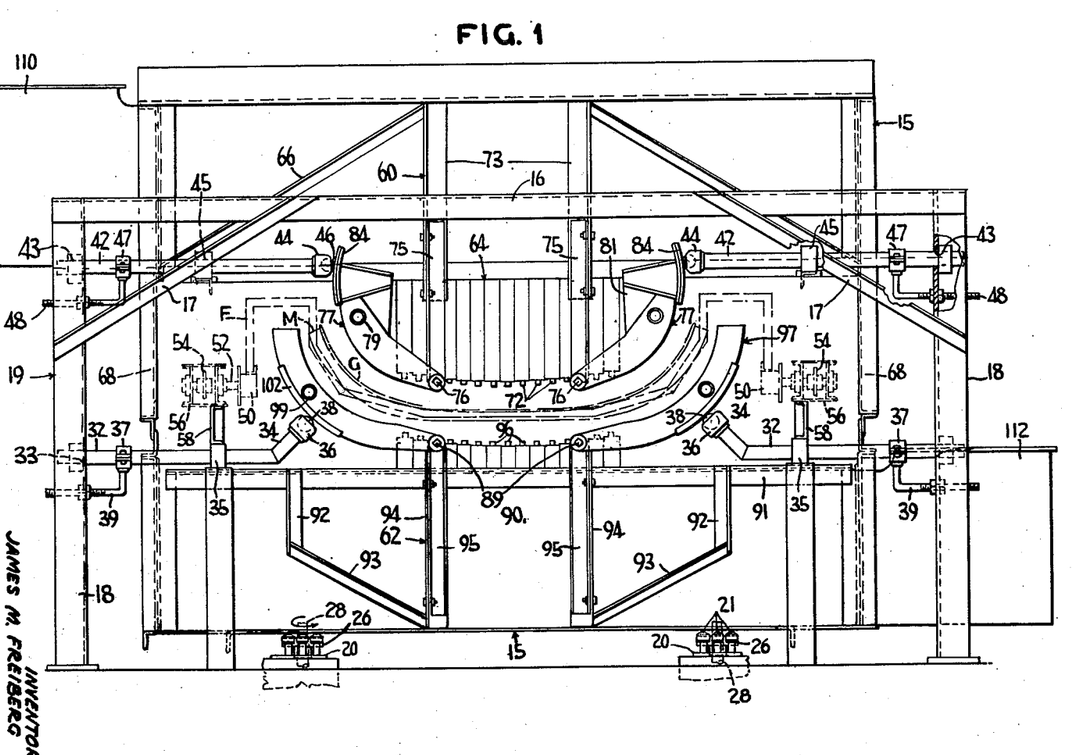
Figure 1 is an end elevational view of tempering apparatus modified according to the present invention showing the apparatus in its central longitudinal position.
Figure 2:
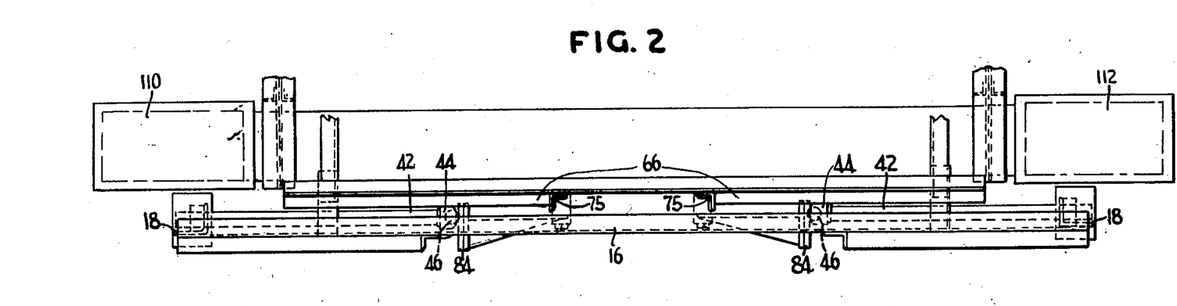
Figure 2 is a top plan view of a portion of the apparatus looking at right angles to Figure 1.
Figure 3:
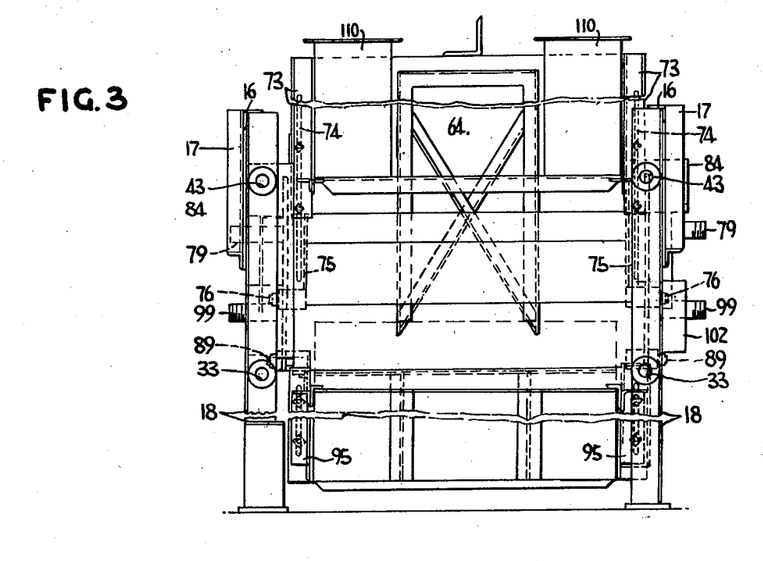
Figure 3 is a side view of a portion of the apparatus shown in Figure 1, with portions removed for clarity, showing the apparatus in extreme front to rear position corresponding to its central longitudinal position.
Figure 4:
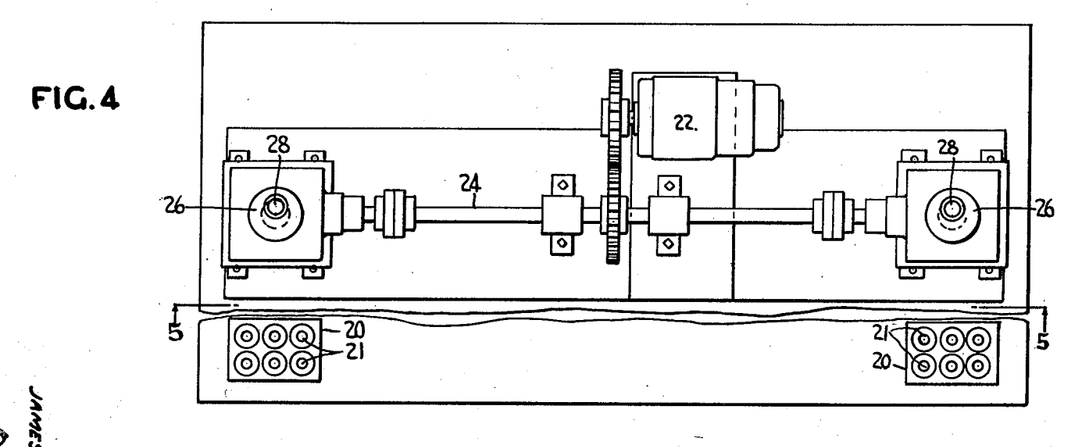
Figure 4 is a plan view of the floor on which the tempering apparatus is mounted.
Figure 5:
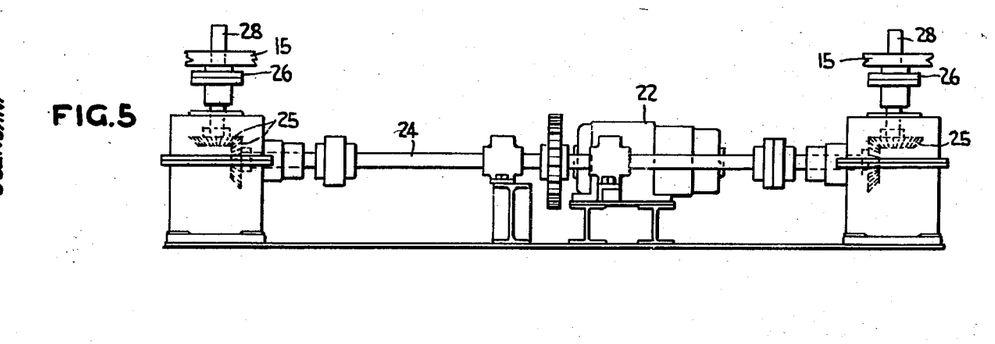
Figure 5 is an elevational view looking along the lines 5—5 of Figure 4.
Figure 6:
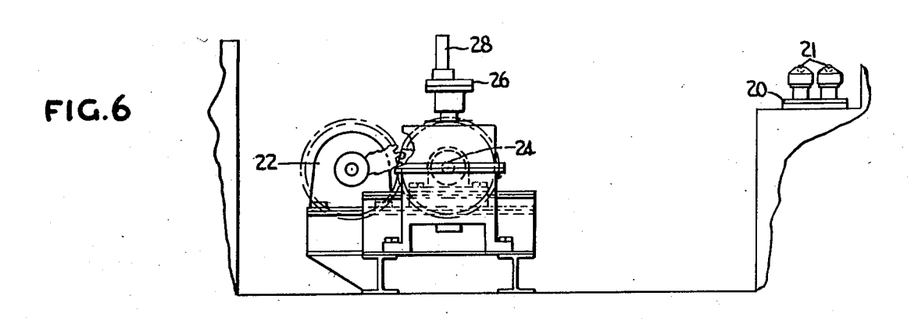
Figure 6 is a side elevational view taken at right angles to Figure 5.
Figure 7:
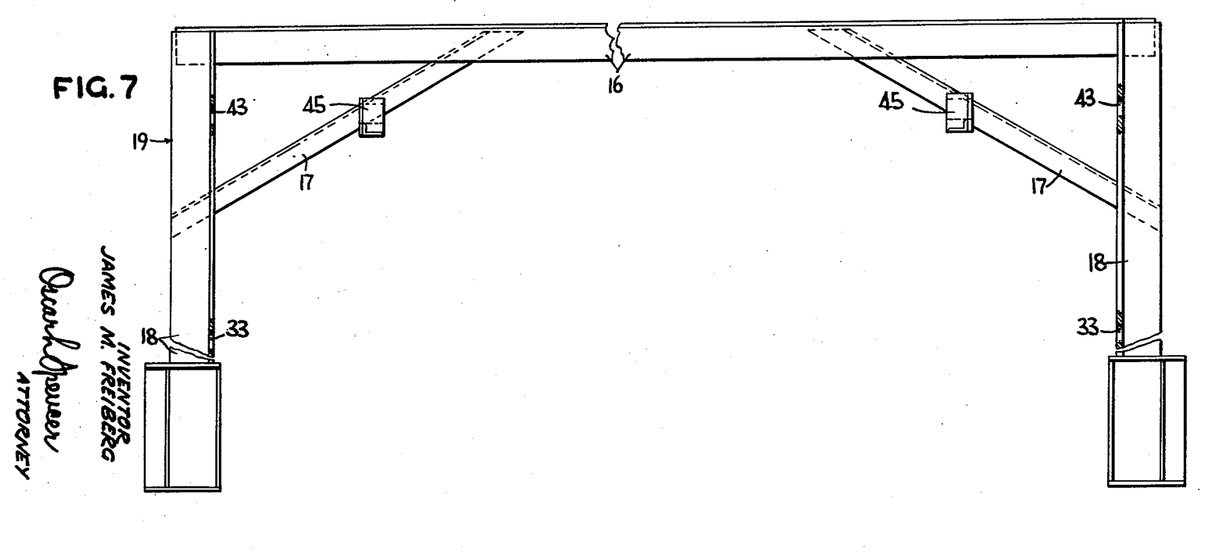
Figure 7 is a front elevation of a stationary frame forming part of the tempering apparatus.
Figure 8:
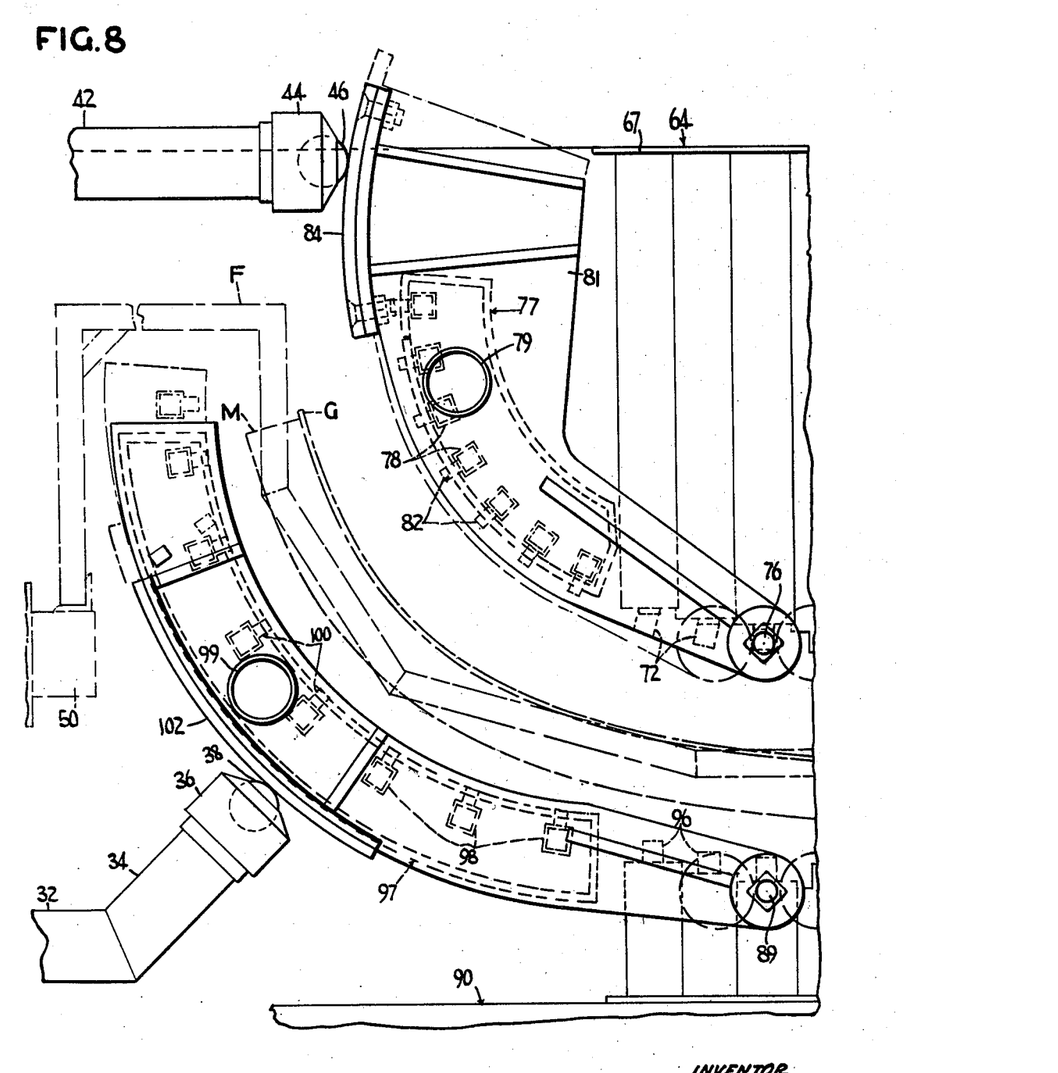
Figure 8 is an enlarged detailed showing of certain elements of a portion of the apparatus seen as in Figure 1, with other details omitted for clarity.
Figure 9:
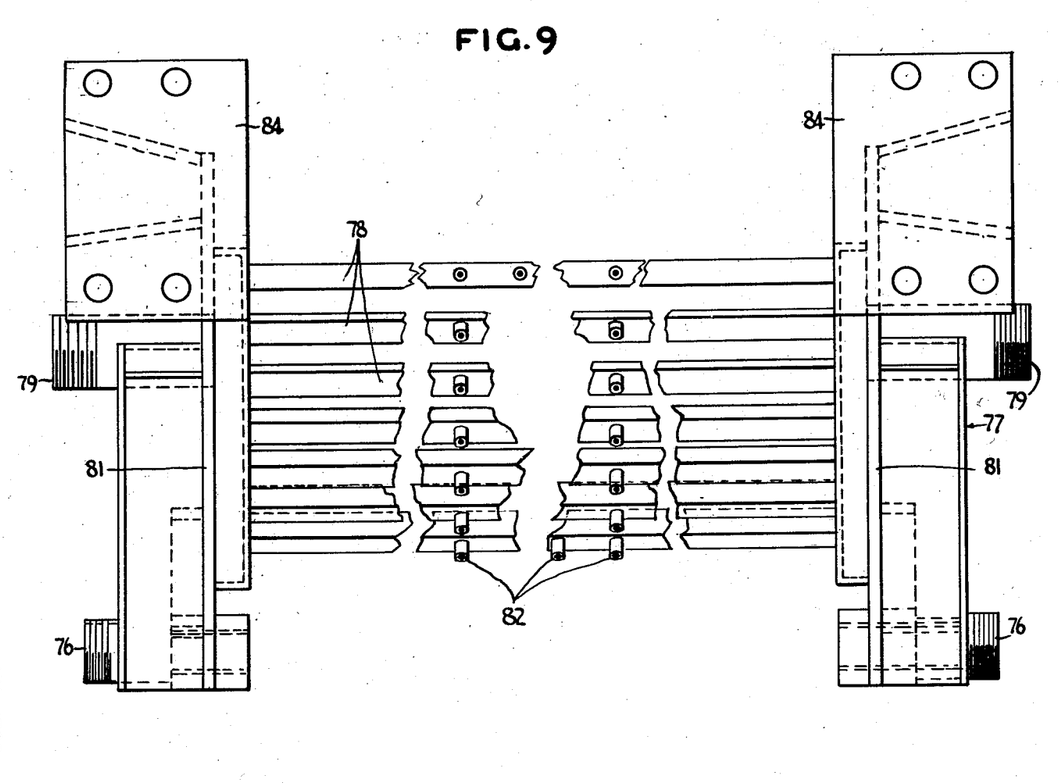
Figure 9 is an end view of an upper wing box showing certain structural details.

Movable frame housing 15 comprises an upper section 60 and a lower section 62. As seen in Figures 1, 8 and 9, upper section 60 supports an air box or nozzle housing member 64 reinforced by beams 66 and 67, and includes columns 68 of interengaged frame members. Attached to the upper air box 64 are air intakes 110 and a plurality of downwardly directed nozzles 72. Vertically directed braces 73 containing slots 74 are also secured to the front and rear of air box 64 and reinforcement braces 66 and 67. Braces 73 may be fixed adjustably to columns 75, which latter terminate at their bottom in pivots 76. Wing boxes 77 containing air boxes 78 with intake ports 79 and outlet nozzles 82 are reinforced with plates 81 and mounted for pivoting about the pivots 76. The outboard extremity of each wing box reinforcement plate 81 contains a wear plate 84 adapted to abut a ball transfer 46. Intake ports 79 are coupled to high pressure air compressors by suitable flexible hosing (not shown).

Figure 10:
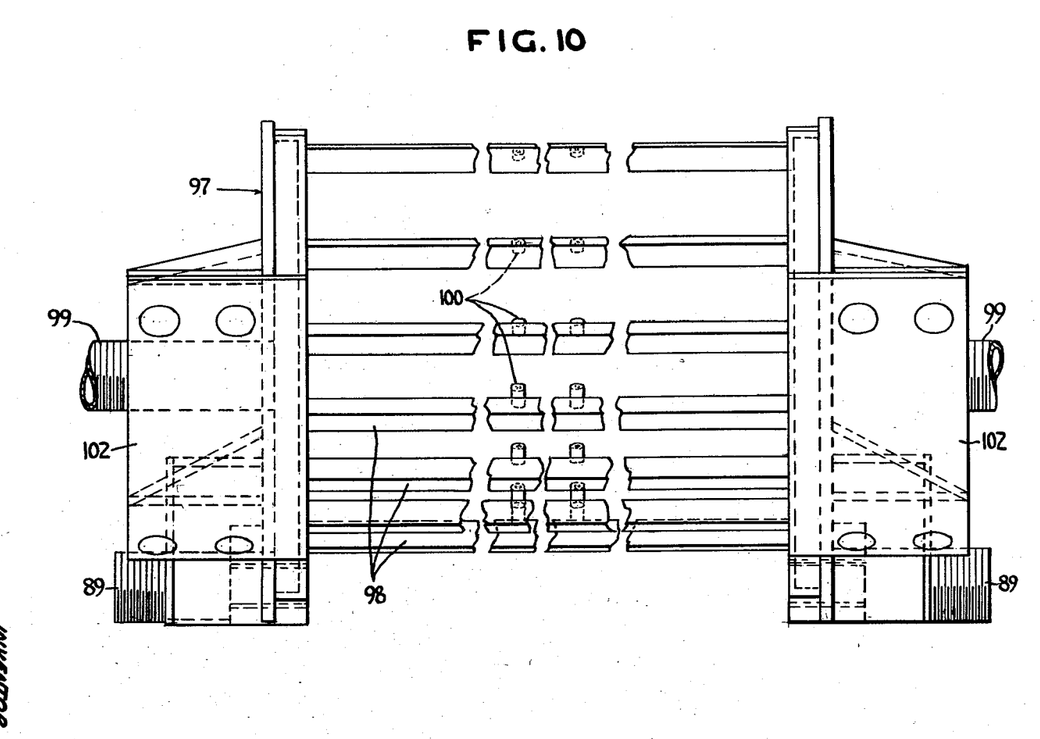
Figure 10 is an end view of a lower wing box showing certain structural details.

Referring now to Figures 1, 8 and 10, the lower portion 62 of the movable frame 15 is mounted in a recess in the floor and comprises a bottom air box 90 reinforced with beam 91, pillars 92, oblique supports 93 and upwardly directed braces 94. The latter are fixed slidably to a vertical brace 95, whose upper end terminates in pivots 89. Air intakes 112 and a plurality of upwardly directed nozzles 96 are attached to the air box 90. Air intakes 110 supply air to upper air box 64, while intakes 112 service lower air box 90. The bottom air box is fixed to the upper air box 60 by columns 68. Each wing box 97 is attached for pivoting at its inboard extremities about the pivots 89. The wing boxes 97 are similar to upper wing boxes 77 and are provided with air boxes 98, inlet apertures 99 and outlet nozzles 100 for imparting air under pressure supplied from air compressors (not shown) toward a surface of curved glass. Each pivotal lower wing box 97 contains a wear plate 102 which abuts a ball transfer 38.

Wear plates 84 and 102 may be curved or flat and are preferably oriented to abut the ball transfers in such a manner that they are normal to radii of curvature of the cylindrical curve defined by the extreme curvature of the glass. This minimizes the misalignment of the preferred nozzle orientation normal to the glass surfaces during pivoting of the wing boxes while the air boxes are moved orbitally during tempering.

Figure 11:
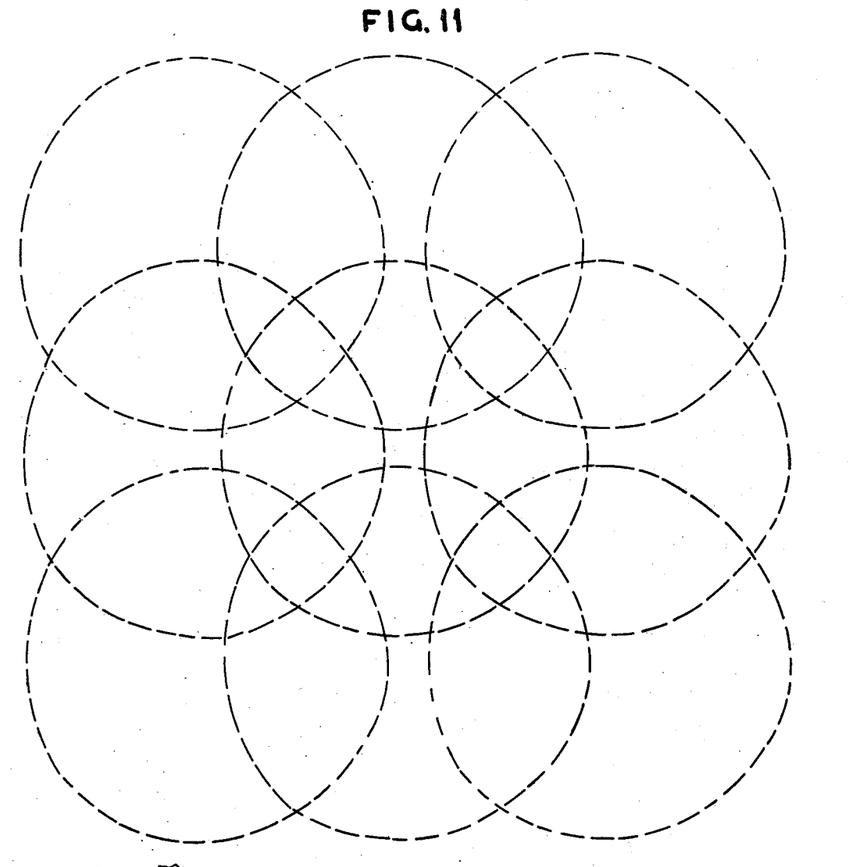
Figure 11 is a diagrammatic showing of the path of movement of the individual air blast nozzles relative to the glass to effect the tempering operation.

Nozzles 72 of the upper air box 64 and nozzles 96 of the lower air box 90 are preferably arranged in a uniform pattern. The diameter of these nozzles is preferably about ½ inch and air is preferred as the tempering fluid because of its low cost. A pressure of from ½ to 1 pound of air is passed through these nozzles, depending upon the thickness of the glass to be tempered. Less pressure is required for tempering thicker glass sheets than thin glass sheets. The rotation of each nozzle defines a circle which overlaps the circle defined by its neighboring nozzles. This provides substantially uniform coverage of each individual area of glass as seen in Figure 11.

It is preferred to install nozzles of smaller diameter in the upper wing boxes 77 than those present in the upper nozzle housing 64 to insure that the nozzles fit into the curved wing boxes to provide sufficient intermediate clearance for the escape of the tempering fluid blasted against the glass. It is preferred that the air nozzles 100 of the lower wing boxes 97 have the same size and spacing as the upper wing nozzles 82.

It is preferred that the same amount of fluid be applied through the wing nozzles 82 and 100 per unit area of glass covered at the extremities of the glass as that supplied per unit area of the center of the glass through the air box nozzles 72 and 96. This preferred pressure variation with nozzle diameter results in more uniform tempering of the glass than occurs otherwise. Consequently, it is desirable to impart a relatively high pressure to the upper and lower wing box nozzles compared to the pressures imparted through the central nozzles 72 and 96. For example, with half inch diameter nozzles mounted on the fixed nozzle housing members imparting air at a pressure from 8 oz. to 1 pound per square inch, equally spaced wing box nozzle diameters of ⅛ inch through which air pressures of between 3 and 5 pounds per square inch are imparted suffice.

Operation of the apparatus

Sheets of glass G mounted on tempering molds M contained in frames F are heated in a horizontal lehr and then conveyed by conveyor rolls 50 into a position intermediate the upper and lower portions 60 and 62 of the movable frame structure 15 so that the center of the glass is intermediate the upper nozzles 72 and the lower nozzles 96. The end portions of the glass G are mounted intermediate the downwardly directed upper nozzles 82 of the upper wing boxes 77 and the upwardly directed lower nozzles 100 of lower wing boxes 97. Air is blasted through the relatively wide nozzle housing member nozzles 72 and 96 at a relatively low pressure and through the relatively narrow wing box nozzles at a relatively high pressure, while the entire frame 15 moves in a circular orbit in a horizontal plane. The orbital movement of the frame results in a horizontal orbital movement of the air box nozzles fixed to the frame. The wing boxes, which tend to move in a horizontal plane with the upper and lower air boxes are constrained from further horizontal displacement by abutment between the wear plates and the ball transfers 36 and 46, tending to pivot the wing boxes in a vertical direction. Thus, the horizontal orbital motion of each wing box is converted into a compound motion, including a vertical reciprocation that substantially parallels the longitudinal extremities of the glass, while the orbital motion of the air box nozzles relative to the glass is maintained. The wear plates may be shaped similarly to the extremities of the glass tempered or may be flat. They are preferably oriented normally to the radius of curvature of a radically bent glass extremity.

Figure 12:
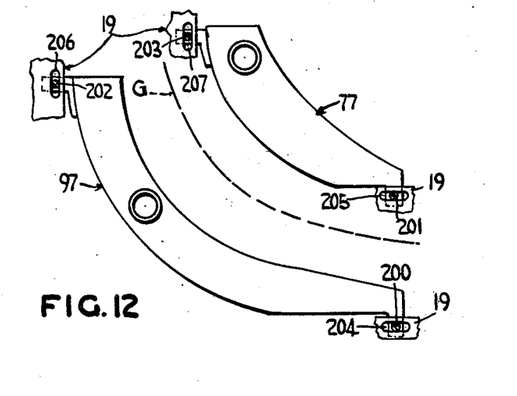
Figure 12 is a schematic showing of an alternate construction to provide the desired change of movement of the wing boxes.

Other obvious modifications of means for changing the horizontal orbital movement of the frame 15 into a complex orbital movement including a vertical component for the wing boxes are typified in the additional schematic sketch of Figure 12. For example, the wing boxes 77 or 97 may be provided with guide rods 200, 201 and 202, 203, respectively. Guide rods 200, 201 may be slidable in horizontal slots 204, 205, respectively, on the stationary frame 19 and guide rods 202, 203 may be slidable in vertical slots 206, 207, respectively, on other portions of the stationary frame 19. Thus, horizontal orbital movement of frame 15 relative to the fixed structure causes a reciprocation of the guide rods within the respective slots, thus resulting in a vertical as well as horizontal displacement of the wing boxes. Other possibilities include arcuate or other curved slots, linkages, splines, and other mechanical couplings suitable for converting planar components into curvilinear movements. These particular arrangements described are not intended to be inclusive, since the number of equivalent mechanical structures that are capable of providing the desired change of movement is limitless.

The particular adaptation of tempering apparatus for tempering glass sheets having severe curvatures described above is illustrative rather than limitative. The result of such adaptation has delayed the scrapping of tempering machines rendered obsolescent by the dramatic change in the design of automobile glass in recent years.

What is claimed is:

1. Apparatus for tempering curved glass sheets comprising spaced means for imparting tempering fluid to opposite surfaces of a curved glass sheet, means for imparting a flat orbital motion to said spaced means, means for supporting a curved sheet of glass between said spaced means, each of said spaced means comprising a structural element pivoted thereto, and means for constraining the displacement of the structural element to convert its flat orbital motion into a compound motion including a reciprocation perpendicular to the plane of orbital motion.

2. Apparatus as in claim 1, wherein a structural element is pivoted to each extremity of the spaced means, and means is included for constraining the displacement of each structural element.

3. Apparatus for tempering curved glass sheets comprising spaced means for imparting tempering fluid to opposite surfaces of a curved glass sheet, means for imparting a horizontal orbital motion to said spaced means, means for supporting a curved sheet of glass between said spaced means, each of said spaced means comprising a structural element pivoted thereto, and means for constraining the displacement of the structural element pivoted to each spaced means to convert its horizontal orbital motion into a compound motion including a vertical reciprocation.

4. Apparatus as in claim 3, wherein a structural element is pivoted to each extremity of the spaced means, and means is included for constraining the displacement of each structural element.

5. Apparatus for tempering curved glass sheets comprising a plurality of spaced nozzle members through which tempering fluid is applied to opposite surfaces of a curved glass sheet supported therebetween, means for moving said nozzle members orbitally relative to the curved glass sheet, wing boxes pivoted to the nozzle members and flanking the latter, each wing box being provided with additional nozzles and curved to conform to the curvature of an extremity of the glass, said nozzle members being curved to conform to the curvature of the central portion of the glass, and an abutment against which the wing boxes move to impart a reciprocation thereto substantially perpendicular to the plane of orbital motion imparted to the centrally disposed nozzle housings.

6. Apparatus according to claim 5, wherein the abutment is so located with respect to the wing box structure so that the nozzles of the wing boxes are moved in an orbital pattern that is substantially uniformly spaced from the glass sheet extremity.

7. Apparatus according to claim 5, wherein each wing box comprises a wear plate and the abutment comprises a fixed ball transfer against which the wear plate abuts during orbital motion of the nozzle members.

8. Apparatus according to claim 5, wherein the nozzles included in the centrally disposed nozzle members have a larger diameter than the nozzles included in the wing boxes.

9. Apparatus according to claim 8, including means to apply tempering fluid under a relatively low pressure through the larger diameter nozzles and means to apply tempering fluid under a relatively high pressure through the smaller diameter nozzles.

10. Apparatus as in claim 9, wherein the tempering fluid used is air supplied at a pressure between about ½ and 1 pound per square inch through the relatively large nozzles and at a pressure between about 3 and 5 pounds per square inch through the relatively small nozzles.

11. Apparatus as in claim 5, wherein the nozzles are in substantially uniform spacing with respect to each other.

12. Apparatus as in claim 11, including means for moving the central nozzle members in an orbit that has an amplitude that is greater than the distance between adjacent nozzles.

13. In apparatus for tempering curved sheets of glass having sharp bends adjacent their opposing extremities, including a fixed frame and a movable frame, an upper air box and a lower air box attached to said movable frame, downwardly directed nozzles projecting from said upper air box, upwardly directed nozzles extending from the lower air box, a curved wing box pivoted to either end of the upper air box and containing downwardly and outwardly directed nozzles, a curved wing box pivoted to either end of the lower air box and containing upwardly and inwardly extended nozzles, said nozzles defining an arcuate space therebetween, means for supporting a sheet of curved glass in the arcuate space, means for blowing tempering fluid at a relatively low pressure through the air box nozzles, means for blowing tempering fluid at a relatively high pressure through the wing box nozzles, means for moving said movable frame in an orbit relative to said fixed frame, and means for pivoting the wing boxes relative to the air boxes during movement of said movable frame.

References Cited in the file of this patent

UNITED STATES PATENTS

| | | |
|---|---|---|
| 2,166,427 | Drake | July 18, 1939 |
| 2,608,029 | Glynn | Aug. 26, 1952 |